United States Patent
Morita et al.

(10) Patent No.: US 12,534,749 B2
(45) Date of Patent: Jan. 27, 2026

(54) MONOACYLATED MEL-PRODUCING MICROORGANISM

(71) Applicants: NATIONAL INSTITUTE OF ADVANCED INDUSTRIAL SCIENCE AND TECHNOLOGY, Tokyo (JP); TOYOBO CO., LTD., Osaka (JP)

(72) Inventors: Tomotake Morita, Tsukuba (JP); Azusa Saika, Tsukuba (JP); Tokuma Fukuoka, Tsukuba (JP); Dai Kitamoto, Tsukuba (JP); Tomohiro Sugahara, Tsuruga (JP); Shuhei Yamamoto, Osaka (JP); Atsushi Sogabe, Osaka (JP)

(73) Assignees: NATIONAL INSTITUTE OF ADVANCED INDUSTRIAL SCIENCE AND TECHNOLOGY, Tokyo (JP); TOYOBO CO., LTD., Osaka (JP)

( * ) Notice: Subject to any disclaimer, the term of this patent is extended or adjusted under 35 U.S.C. 154(b) by 620 days.

(21) Appl. No.: 17/784,032

(22) PCT Filed: Dec. 2, 2020

(86) PCT No.: PCT/JP2020/044881
§ 371 (c)(1),
(2) Date: Jun. 9, 2022

(87) PCT Pub. No.: WO2021/117580
PCT Pub. Date: Jun. 17, 2021

(65) Prior Publication Data
US 2023/0037120 A1 Feb. 2, 2023

(30) Foreign Application Priority Data
Dec. 12, 2019 (JP) .................................. 2019-224670

(51) Int. Cl.
C12P 19/12 (2006.01)
C12N 1/16 (2006.01)
C12N 15/81 (2006.01)

(52) U.S. Cl.
CPC ............... *C12P 19/12* (2013.01); *C12N 1/16* (2013.01); *C12N 15/81* (2013.01)

(58) Field of Classification Search
CPC . C12P 19/12; C12P 19/44; C12N 1/16; C12N 15/81; C12N 15/815; C12R 2001/645; C07K 14/375
See application file for complete search history.

(56) References Cited

FOREIGN PATENT DOCUMENTS

| JP | 2008-079600 A | 4/2008 |
| JP | 2009-296908 A | 12/2009 |
| JP | 2011-172526 A | 9/2011 |
| JP | 2011-182660 A | 9/2011 |
| JP | 2011-182740 A | 9/2011 |
| JP | 2018-052874 A | 4/2018 |
| JP | 2018-113946 A | 7/2018 |
| WO | 2016-189988 A1 | 12/2016 |
| WO | 2017-208791 A1 | 12/2017 |

OTHER PUBLICATIONS

Morita et al. JP2018052874A. Claims (Translated). Patentscope. wipo.int. (Year: 2016).*
Cortés-Sánchez et al. "Biological activity of glycolipids produced by microorganisms: New trends and possible therapeutic alternatives," Microbiological Research, vol. 168, Issue 1, 2013, pp. 22-32. (Year: 2013).*
Morita et al., "Isolation of Basidiomycetous yeast *Pseudozyma tsukubaensis* and Production of Glycolipid Biosurfactant, a Diastereomer Type of Mannosylerythritol Lipid-B," *Appl. Microbiol. Biotechnol.*, 88(3): 679-688 (2010).
Saika et al., "A Gene Cluster for Biosynthesis of Mannosylerythritol Lipids Consisted of 4-O-β-D-Mannopyranosyl-(2R,3S)-Erythritol as the Sugar Moiety in a Basidiomycetous Yeast *Pseudozyma tsukubaensis*," *PLoS One.*, 11(6): e0157858 (2016).
Saika et al., "A Putative Transporter Gene PtMMF1-deleted Strain Produces Mono-Acylated Mannosylerythritol Lipids in *Pseudozyma tsukubaensis*," *Appl. Microbiol. Biotechnol.*, 104(23): 10105-10117 (2020).
European Patent Office, Extended European Search Report in European Patent Application No. 20900105.6 (Dec. 15, 2023).
Jezierska et al., "Yeast Glycolipid Biosurfactants," *FEBS Letters*, 592(8): 1312-1329 (2018).
China National Intellectual Property Administration, First Office Action in Chinese Patent Application No. 202080086063.7 (Jul. 27, 2023).
Fukuoka, "Expansion of Structures and Functions of Novel Glycolipid Biosurfactants," *Oleoscience*, 9(4): 127-133 (2009).
Fukuoka et al., "Characterization of New Types of Mannosylerythritol Lipids as Biosurfactants Produced from Soybean Oil by a Basidiomycetous Yeast, *Pseudozyma shanxiensis*," *Journal of Oleo Science*, 56(8): 435-442 (2007).
Japan Patent Office, Office Action in Japanese Patent Application No. 2021-563892 (Oct. 1, 2024).
Fukuoka et al., "Structural Characterization and Surface-active Properties of a New Glycolipid Biosurfactant, Mono-acylated Mannosylerythritol Lipid, Produced from Glucose by *Pseudozyma antarctica*," *Appl. Microbiol. Biotechnol.*, 76(4): 801-810 (2007).
Fukuoka et al., "The Diastereomers of Mannosylerythritol Lipids Have Different Interfacial Properties and Aqueous Phase Behavior, Reflecting the Erythritol Configuration," *Carbohydr. Res.*, 351: 81-86 (2012).

(Continued)

*Primary Examiner* — Adam Weidner
*Assistant Examiner* — Dennis Ignatius Armato, Jr.
(74) *Attorney, Agent, or Firm* — Leydig, Voit & Mayer, Ltd.

(57) ABSTRACT

Provided is a monoacylated MEL. A microorganism of the genus *Pseudozyma* produces monoacylated MEL-B.

12 Claims, 6 Drawing Sheets

Specification includes a Sequence Listing.

(56) References Cited

OTHER PUBLICATIONS

Hewald et al., "Identification of a Gene Cluster for Biosynthesis of Mannosylerythritol Lipids in the Basidiomycetous Fungus *Ustilago maydis*," *Appl. Environ. Microbiol.*, 72(8): 5469-5477 (2006).
Saika et al., "Biosynthesis of Mono-acylated Mannosylerythritol Lipid in an Acyltransferase Gene-disrupted Mutant of *Pseudozyma tsukubaensis*," *Appl. Microbiol. Biotechnol.*, 102(4) 1759-1767 (2018).
Japan Patent Office, International Search Report in International Application No. PCT/JP2020/044881 (Jan. 19, 2021).

* cited by examiner (a)

(b)

(B)

(C)

(D)

(a)

(b)

```
                              SEQUENCE LISTING

<160> NUMBER OF SEQ ID NOS: 22

<210> SEQ ID NO 1
<211> LENGTH: 1688
<212> TYPE: DNA
<213> ORGANISM: Pseudozyma antarctica

<400> SEQUENCE: 1
atggacgaca agatcgcgct gacgagcaac gacggcgagc ggccgaggat gaagaaggac      60
tggcgcttct ggacgatctt tgctgcgctc atgctgattg cctttctagc tggtgcgttc     120
tcatccatcc cgacctcttt catcggtcta tgctgacatt tggcttcgca gcgctggaca     180
tgacgatgat ctcgacggcg ctgcctgcga ttgtggctgc actaccgcct tcgtcgatcg     240
cggcgaactg gatcacctcg gcattccttc tacccatggt tgcttcgcag ccgatctttg     300
gaggtctgag ctgctcgctg gacgcaaga actcggtcat ctctgctctg gtcatctttc     360
tggtcggatc gatcgtttgc gccacggcca agtcggtgct ggtgcttgtc gtcggacgcg     420
gcgtgcaggg gttgggggt ggaggtatcc atgcgctctc cgagatcatc atgtccgacc     480
tcaccacgct gcgcgaacga ggcgtgtact ttggcctcat tgcactcgta ttcgccgtag     540
ccggattcat cgctccggtg ctgggtggcg tgtttagcca ctcgagctgg ccgtggatct     600
tctggatcaa cctacccatc ggagcagtgg cactggtgct gctggtgctg ttcctcaaca     660
tccgcgtgcc cctgctcacg ggaaggcaga agtgggagaa gctggatctg gtcggtaacg     720
caattctgtt cggatcggtc actgccgtcc tcattgccgt taccgagggc gggataaagt     780
accgctggtc agacgcgcga gtctgggtgc ctctcgtcgt gggactgatt gggttggtgg     840
cgtttttgat ggtggagtgg atccccggac cgttgtgtag cagccagtg tttccgcgcg     900 acctgttcgc caaccgcacg gctgccgttg cgtacctcca aaccttcctg cacggcgtga     960
tcttctacgg catcatctac atggtgccca tctacttcca ggcgatcaaa gaccgtacac    1020
cgctccagtc ggccatctgg tccttcccc tcaccgcccc ctccacccct ctcgccctca    1080
ttgctggtct gctgattagc atctcgggcc ggtacaagaa gctcatcttc attggatggg    1140
cgttgatggc tggaggagtc ggatggctta cccactggtc ggtgggtact tccaaagccg    1200
aatgggcgat ttctcagatc atagcaggtg cggggattgg aattatgttc cctatcacgc    1260
tgccgcctat tcaagcctct ctgccggtgg agaggctgga agcggcaact gccgcctatg    1320
ccttttcgcg aacatttggt gccgtttggg gcatcactgg ggctaccacg atctttgcca    1380
ctcaggcggc caagaagctg cgaccggact atgggcaact cgaaccgctg gggcttaacg    1440
actttacggt gatcgccttt gcagagtcgc tgcggtacct gcccgagcag ctgcaggtgc    1500
tggtcaagaa ggtgtatgca gacgccattt ccgactcgtt ctggctcttt gttccgctcg    1560
ccatcattgg gtttgcctcg acattcctgc tcaaggatct tccgctgccg gactttatca    1620
agagccaagc ggtgctcgag gagaagggcg ccagcgaaaa cgcctcgcct cccgaatccc    1680
ttgcttga                                                             1688

<210> SEQ ID NO 2
<211> LENGTH: 1696
<212> TYPE: DNA
<213> ORGANISM: Pseudozyma antarctica

<400> SEQUENCE: 2
```

-continued

| | | |
|---|---|---|
| atggacgaca agattgcgct gacgagcaac gaaggcgagc ggcctcggat gaagaaggac | 60 |
| tggcgcttct ggacgatctt tgcagcgctg atgctgattg cctttctagc tggtgcgttc | 120 |
| ccacccatcc tcatgcgcgc tttgaagcat tgctgacga ttagacttgg tagcgctgga | 180 |
| catgacgatg atttcgacgg cgctgcctgc gattgtggct gctttgccac catcctcgat | 240 |
| cgcggccaac tgggtgacct ctgcatttct gctacccatg gttgcttcgc agccgatctt | 300 |
| tggagggctg agctgctcgc tgggacgcaa gaactcggtg aacgctgcgc tgatcatctt | 360 |
| tctggtgggg tcggtggtgt gtgcgacggc caagaccatg ttggtgctgg tggtcggacg | 420 |
| cggtgtacag gggttgggcg gtggaggtat acacgcgctg tcggagatca tcatgtccga | 480 |
| tctcaccacg ctccgcgaac ggggagtcta cttcggcctg atcgcactcg tgtttgccgt | 540 |
| ggccgggttc attgctcccg tgctgggtgg ggtgtttagt cattcgaatt ggccgtggat | 600 |
| cttttggatc aacttgccca ttggggccgt ggcgctggtg atgctggtgt tgttcctcaa | 660 |
| catccgcgtg ccgctgctga cgggaagaca gaagtgggag aagctcgatc tggtgggtaa | 720 |
| cgcagtcttg tttggatcgg taacggccgt tctcatcgcc gttaccgagg gcggcatcaa | 780 |
| gtatcgctgg tcagatcccc gagtctgggt gcctctggtg gtgggcctga tcggacttct | 840 |
| ggcgttcttg atggtggagt ggattccagg accgctgtgt aggcaacccg tgtttccacg | 900 |
| cgacctgttt gccaatcgca ccgccgcagt ggcgtacctg caaaccttt tgcacggcgt | 960 |
| catcttttac ggcatcatct acatggtgcc catctacttt caggcgatca agaccggac | 1020 |
| acccctcgaa tcggcaattt ggtccttccc cctaactgca ccctccaccc cccttgcgct | 1080 |
| ggtcgccgga ctgatcatca gcatctccgg gcggtataaa aatctcatct tcctcggatg | 1140 |
| ggcgctcatg gctggtggcg tcggttggct tacccactgg tcggtgggaa catccaaagc | 1200 |
| cgagtgggtt atttctcaaa tcatcgctgg agcaggatt gggatcatgt tccccatcac | 1260 |
| gctgccgccg attcaggcct cgctacccgt ggagaggctg gaagcagcca cggccgccta | 1320 |
| tgccttttcg cgaacattcg gtgcggtgtg gggcatcact ggggctacca cgatcttcgc | 1380 |
| cacgcaagca gccaagaacc tgcgaccgag ctatgcgcaa ctcaacccgc tgggtttgga | 1440 |
| cgatttcacg gtgatcgcct ttgcagagtc gctgaggtat ctgccgaaag agctgcaggt | 1500 |
| gctggtcaag aaggtgtatg ccgatgcgat ttcggattcg ttctggctgt tcgtcccgct | 1560 |
| cgccatcatc ggattcctgt ccaccttgct gctcaaggat cttccgctgc cggactttat | 1620 |
| caagagccag gccgtgttgg aggagaagaa cgagtcgaac ggccaaagcc catctccttc | 1680 |
| cgagagcctt gtttga | 1696 |

<210> SEQ ID NO 3
<211> LENGTH: 2766
<212> TYPE: DNA
<213> ORGANISM: Pseudozyma hubeiensis

<400> SEQUENCE: 3

| | | |
|---|---|---|
| atgccaagca gcactagcgg ccgtcgtact cggggcaaac gctccgaaga ttgccacagt | 60 |
| ctggccggtc tgactcggca ggacgttgag agcgatggtg aagccaagca ggaggacgaa | 120 |
| agcgcagact ggaccacgg catcgatctc tattccagat acctcggctt gaacagcgct | 180 |
| gaaggagacc ggactctgca gcgggagcaa gatcggcgtc ttgggccaag aggccgttca | 240 |
| gtaacctttg atgagacgac cagcgtgctt gacaacacag aggcggtggt cgcgaggcgg | 300 |
| caagcgtact gtgagcagtg gcggcaacga acggccgcga aggacagctc tcagccagat | 360 |
| gagcagtggc agctgcagca tgcacctccg gcaatcgttc gcagcggcgg tgacaacaac | 420 |

```
cgtgtcgctc catctttagc ttccaagctt cgaaaccttg ttccaccgcc tcttccaccc    480
cctagaaact cgatcttgcc gccgacgcca ctcaaccctg cgcttagcgg aaatcatcag    540
atcgttgatt tcagtgtccg aggcggtcca ctctttgtcg aaatcaaggg tacctccggt    600
gttcaacgga gacctccttc cagccggcta gaaccgccga cacagcagcc ggaagcgcaa    660
tcgctcgaac tcccctcaga ttcgcgaagg cacggtcgtt ccaactgggt cttctttgac    720
gctgatccct tgcagctttc ctctccaccc tctcctcccg agcaacaaca acttcatcaa    780
ctcaagccaa gcccttcttc tcgccaccac tccacatcct cgtctgtcga gctctctgca    840
tccaacgcag ttctacgcca gcgactcata gctcaaacat ccgtcgtcgc cagcgaggcc    900 tcccttcga gctggtcgat catgtccgac gagaagcgcg cctcgatcga ggtgccggac    960
agccctggga gctactcgac cgccaacgct cctggcctct acaagtcgag cgatgcgtct   1020
agcgtccccg cgtatccgta tcgggaaaag gcgaacattt ccgagagccc atcacaagat   1080
acatctcctg actccacggc gagcgccacc cctaccgaga cggaaagcga actcggcccg   1140
agggtgaaga aagacctgcg gttctggatg atcttcagcg cgctcatgct gatcgccttc   1200
atcgcggcac tcgacatgac catgatcagc acggcgctac cctcgatcac ctcggacctt   1260
cctccgtcga cgatcgccgc caactgggtc acttcggcct tcctcctgcc catggtggcc   1320
tcgcaaccca tctttggcgg tctctcgtgt cgatcggtc gtccgtggtc gatcaactct   1380
gcgctcgtca tctttctggt ggggagcgtg gtgtgcgcca cgtccaagag cttcttgatg   1440
ctggtggtgg gcagaggtat tcaggggttg ggcggagggg ggatccacgc catgtgcgag   1500
atcatcatgt cggatctgac gacgttgagg gagagagggt tgtactttgg tctgatcgcc   1560
ttggtctttg cggtggcagg gttcgcagct cccgtgctgg gtggtgcttt tagcgaacac   1620
tcttggcctt ggatcttttg gatcaatctg ccgatcggcg cggtagcact ggtcatgttg   1680
atcgtcttcc tcaagatcaa agtcccactg ctgacaggca aggagaggtg gcagaggctg   1740
gacctggtgg gaaacgctat tctgttcggc tcggtcactt cgatcctgat cgcggtgacc   1800
gagggtggaa tcaagtaccc cttggtcatcg tggcagattt gggtgccact cgtcgtcgga   1860
ctgttgggta tgggcttgtt cctcgtgatc gaatgggtgc ccaaccgcat ctcccccaaa   1920
ccagtgttcc ccttggacct gttccagaac agaaccgccg ccttcgccta cctgcaaacc   1980
ttcctccacg gcgtcatctt ctacggcgtc atctacatcg tacccatcta cttccaggcc   2040
atcaaggacc gcacgccact gcagtccgcg atctggtcgt tccccatgac cgcccctcc   2100 ttcccgctgg ccatggcagc aggcatcttg atctcggtca ctggcaagta caagctgctg   2160
attttcgccg ggtggatcct catggctgcc ggtgtaggat ggatgactca ctggcacgtt   2220
gccacgtcca agctcgaatg ggcgttctcg caagtcatcg cgggagctgg cttgggcatc   2280
ctcttcccga tcacccttcc accgatccaa gccgcgctcc cgtcgtctcg actggaaagc   2340
gccacggcag cgtacgcctt cacccgcacc ttcgtgctgc tgtggggcat caccgctgcc   2400
accaccatct tctccacgca gaccgccaaa aaccttcgcc cctactacgc gcagctcaac   2460
ccgctcggtc tgaccgactt taccgtcatc gccttctcgg aaagcctccg ccacctgccg   2520
cagccaatcc agggcgtagt gaagcgtgtc tacgcagacg ccatatcgga ctcgtactgg   2580
ctcttcgtcc ctctggccat catcgggttt gcgactacgt ttgggatgag ggagttgccg   2640
ttgccggatt tcatcaagtc cgaggcaaag atggagcaga aggaggactc ggtgccggcg   2700
ttggcgagcg gcgcggaaca tgccgtggtg ggtatcagga cagaggtgcc gtctactgtg   2760
```

```
                                                            -continued
ccttga                                                          2766

<210> SEQ ID NO 4
<211> LENGTH: 1755
<212> TYPE: DNA
<213> ORGANISM: Pseudozyma tsukubaensis

<400> SEQUENCE: 4
atggacgaga aattctcctc tcccgctaac tcgatcacgg gtccgggcga acaggcaagc      60
actcctgcaa gcatcaacac tcctgagcat tcgcacgata tctcaaatgt cccaacgctc     120
cccgagagcg gaggcaacga tgacgagtct ggacacagga ttaagaaaga ctggcgattc     180
tggatggtgt ttgccggcct gatcttgagt gccttcatca ctgcgttgga catgactatg     240
atctccaccg cattgccagc cattgttgct gctctgcctc aaagtacgat tgcagccaac     300
tgggtgacgt ctggtttcct cttgcccatg gttgcgtctc aacccatttt cggtggactc     360
agctgctccg tcggacgcaa gatctcgttc aattcggcac tgatcatctt ccttgtaggc     420
agcgtcgttt gcgccactgc caagactttc cttgttctcg tcatcggtcg aggcattcag     480
ggtctgggcg gaggaggaat ccatgccatg tccgaaatca ttatgtcgga tctcaccact     540
cttcgagagc gaggactctt ctttggtctg gtggcacttg tcttcgcagt cgctggcttt     600
gtggctcccg tgcttggagg tgtcttcagc gagcacaatt ggccatggat tttctggatc     660
aatcttccca tcggtgcggc ctcccttatc gtactcgtgc tcttcctcaa catccgcgtt     720
cccctcttga ccggaaggga gaagtggcag cgtctcgatc tggttggcaa cgccatcctc     780
tttggctctg taacctccat tttgattgcg atcacagagg gcggcatcaa atacgcatgg     840
tcttcccctc gcgtctggat cccacttgtt gtcggcttgc tcggcatggg gctcttcctc     900
gctgttgaat ggatcccaaa tgcttcgca ccgaagccag cgttcccgct cgatctcttc     960
cagaatcgca ctgcagcctt ctcctacctc gaaactttct ccacggcgt tgtcttttac    1020 ggcgttgtct acatgatccc catctacttc cagtccatca agatcgcac tccacttcag    1080 tcggctatct ggtctttccc tttgactgcg ccttcttgtc cctttgccat cctcgctggg    1140
ctctcggtgt cacttacggg acgatacaag aaagccatct tcatcggctg gattctgatg    1200
gctggcggca ttggctggat gacagcctgg aacgtcaaca ctggcaaagc atcatgggcc    1260
atctcccaag tcatcgctgg agccggtatc ggtatcttgt tccccatcac acttcctccc    1320
gtgcaagctt ctctccctgc ctcacgtctc gaagccgcca cctctgccta cacattcacc    1380
cgcacctttg gcgctgtctg gggcatcaca ggcgctacca cgatcctctc cacgcaagcg    1440
gctcacaacc ttcgccgta ttacccgcag ctcaatccac ttggtttgaa cgacttcagc    1500
atcattgcgt atgccatctc cctcaaggac cttcccgagc cgatccaggg agttgtcaag    1560
aaggtctatg ccgatgcgat cggtaagagc ttctggctct tgttcccct ttgcatcgtt    1620 ggttttcttg ctactttcgc gatcaaggat ctaccgctgc cggactacat caagtccgaa    1680
gcgaagttcg agggcaagga agatgcgttg cgtgtcatcg ctgcatcgca cgaggttcca    1740
agcacaatgc cttga                                                    1755

<210> SEQ ID NO 5
<211> LENGTH: 1755
<212> TYPE: DNA
<213> ORGANISM: Pseudozyma tsukubaensis

<400> SEQUENCE: 5
atggacgaga aattctcctc tcccgctaac tcgatcacgg gtccgggcga acaggcaagc      60
```

```
actcctgcaa gcatcaacac tcctgagcat tcgcacgata tctcaaatgt cccaacgctc      120
cccgagagcg gaggcaacga tgacgagtct ggacacagga ttaagaaaga ctggcgattc      180
tggatggtgt ttgccggcct gatcttgagt gccttcatca ctgcgttgga catgactatg      240
atctccaccg cattgccagc cattgttgct gctctgcctc aaagtacgat tgcagccaac      300
tgggtgacgt ctggtttcct cttgcccatg gttgcgtctc aacccatttt cggtggactc      360
agctgctccg tcgacgcaa gatctcgttc aattcggcac tgatcatctt ccttgtaggc       420
agcgtcgttt gcgccactgc caagactttc cttgttctcg tcatcggtcg aggcattcag      480
ggtctgggcg gaggaggaat ccatgccatg tccgaaatca ttatgtcgga tctcaccact      540
cttcgagagc gaggactctt ctttggtctg gtggcacttg tcttcgcagt cgctggcttt      600
gtagctcccg tgcttggagg tgtcttcagc gagcacaatt ggccatggat tttctggatc      660
aatcttccca tcggtgcggc ctcccttatc gtactcgtgc tcttcctcaa catccgcgtt      720
cccctcttga ccggaaggga gaagtggcag cgtctcgatc tggttggcaa cgccatcctc      780
tttggctctg taacctccat tttgattgcg atcacagagg gcggcatcaa atacgcatgg      840
tcttcccctc gcgtctggat cccacttgtt gtcggcttgc tcggcatggg gctcttcctc      900
gctgttgaat ggatcccaaa tcgcttcgca ccgaagccag cgttcccgct cgatctcttc      960
cagaatcgca ctgcagcctt ctcctacctc gaaactttct tccacggcgt tgtcttttac     1020
ggcgttgtct acatgatccc catctacttc cagtccatca agatcgcac tccacttcag      1080 tcggctatct ggtctttccc tttgactgcg ccttcttgtc cctttgccat cctcgctggg     1140
ctctcggtgt cacttacggg acgatacaag aaagccatct catcggctg gattctgatg      1200 gctggcggca ttggctggat gacagcctgg aacgtcaaca ctggcaaagc atcatgggcc    1260
atctcccaag tcatcgctgg agccggtatc ggtatcttgt tccccatcac acttcctccc    1320
gtgcaagctt ctctccctgc ctcacgtctc gaagccgcca cctctgccta cacattcacc    1380
cgcacctttg gcgctgtctg gggcatcaca ggcgctacca cgatcctctc cacgcaagcg    1440
gctcacaacc ttcgcccgta ttacccgcag ctcaatccac ttggtttgaa cgacttcagc    1500
atcattgcgt atgccatctc cctcaaggac cttcccgagc cgatccaggg agttgtcaag    1560
aaggtctatg ccgatgcgat cggtaagagc ttctggctct tgttcccct ttgcatcgtt    1620 ggttttctcg ctactttcgc gatcaaggat ctaccgctgc cggactacat caagtccgag    1680
gcgaagttcg agggcaagga agatgcgttg cgtgtcatcg ctgcaacgca cgaggttcca    1740
agcacaatgc cttga                                                    1755

<210> SEQ ID NO 6
<211> LENGTH: 2098
<212> TYPE: DNA
<213> ORGANISM: Pseudozyma aphidis

<400> SEQUENCE: 6
atggcgctta gtgtgtgtgg tcgccgggcc ggaaggagcc gttcgaaaag cagggatccc       60
tgacatgcac ctcagctccc ctgcgttgag caccaaagcc accgcactgt tcaactgcat      120
accaccatca gaagatcggc ttgcagcgtt gcctatcttc gaaactagtg cacacgttcg      180
tcactgtgaa agacacctcg acctcgcgca acccattttg ccaccagaac gcaacatcct      240
tgcgcttgaa ggactggcag gcagactgca ttgactcggc ggtgcgcaga cattgctaca      300
gcgccactgc aagcggcctc gacaagtacg aaagcacttg tcaaaatccg ctccttcttt      360
```

```
ccgacctacc ttgaccaccg aacagcccaa ctcgacgcta cacgatggac gacaagattg      420
cgctgacgag caacgaaggc gagcggccga ggatgaagaa ggactggcgc ttctggacga      480
tctttgcagc gctgatgctg attgcatttc tggctggtgc gttgctcgcc ttcccgtcac      540
cttcttgggc atatgctgac gtttggattc tgtagcgctg acatgacga tgatttcgac       600 ggcgctgcct gcgattgtgg ctgcgctacc accttcgtcg atcgcggcca actgggtgac      660
ctctgcattc ctgctaccca tggtagcgtc gcagccgatc tttggtgggc tgagctgctc      720
gctgggacgc aagaactcgg tgaacgctgc gctgatcatc tttctggtgg gatcggtggt      780
gtgtgcgact gccaagtcga tgctggtgct ggtcgtcgga cgcggtgtgc aggggttggg      840
cggtggcggt atccacgcgc tgtcggagat catcatgtcc gatctcacca cgctccgcga      900
acgaggcgtc tactttggcc tgatcgcact cgtgtttgca gtggcagggt tcattgctcc      960
cgtgctgggc ggagtgttta gccactcgaa ttggccgtgg atcttttgga tcaacttgcc     1020
gattggagcg gtggcgctgg tgatgctggt gctcttcctc aacatccgcg tgccgttgct     1080
gacgggaagg cagaagtggg agaagctcga tctggtgggc aacgcaatct tgtttggatc     1140
ggtaactgcc gtactcatcg ccgttaccga gggcggcatc aagtaccgtt ggtcagacgc     1200
tcgagtctgg gtgcccctcg tcgtcggcct gatcggactg ctggcgttct tggtggtgga     1260
gtggattccg ggaccgttgt gtaggcagcc agtgtttccg cgcgacctgt tcgccaaccg     1320
cacggccgca gttgcatacc tccaaaacctt cctgcacggc gtcatctttt acggcatcat     1380
ctacatggtg cctatctact tccaggcgat caaagaccgt acaccctcg aatcggcaat     1440 ttggtccttc cccttgactg caccctccac cccgctcgcg ctaattgccg gactgctcat     1500
cagcatctcg ggccggtata aaaagctcat cttttctcgga tgggctttga tggctgcagg     1560
cgtcggttgg cttacgcact ggtcggtggg gacatccaaa gccgagtggg tcatctctca     1620
aatcatcgct ggtgcgggca ttgggatcat gttccccatc acgctgccgc ccattcaagc     1680
ctcgctaccg gtggagaggc tggaagcagc tacggccgcc tatgccttt cgcgaacatt     1740 cggtgcggtg tgggggatta cgggtgcaac aacgatcttc gccacgcaag cagccaagaa     1800
cttgcgaccg agctatgcac agctaaaccc gctgggtctg gatgatttca cgataatcgc     1860 cttttgcagag tcgctcagac atctcccgca agagctgcag gtgctggtga agaaggtcta     1920
tgcagatgcc atttccgact cgttctggct gttttgtcccg ctcgccatcg tcggattcct     1980
gtccaccttg ctgctcaagg atctaccgct gccagacttt atcaagagcc aagccgtgct     2040
cgaggagaag aacgagtcga acagccaaag cccctcgcct ccggagtcgc tcgtttga       2098
```

<210> SEQ ID NO 7
<211> LENGTH: 20
<212> TYPE: DNA
<213> ORGANISM: Artificial Sequence
<220> FEATURE:
<223> OTHER INFORMATION: Synthetic

<400> SEQUENCE: 7
gctgctgtgt ccgctgcacg      20

<210> SEQ ID NO 8
<211> LENGTH: 20
<212> TYPE: DNA
<213> ORGANISM: Artificial Sequence
<220> FEATURE:
<223> OTHER INFORMATION: Synthetic

<400> SEQUENCE: 8

```
gagatgtcgt cggctggagc                                              20

<210> SEQ ID NO 9
<211> LENGTH: 20
<212> TYPE: DNA
<213> ORGANISM: Artificial Sequence
<220> FEATURE:
<223> OTHER INFORMATION: Synthetic

<400> SEQUENCE: 9
gagtgccgac ggtggacgtc                                              20

<210> SEQ ID NO 10
<211> LENGTH: 20
<212> TYPE: DNA
<213> ORGANISM: Artificial Sequence
<220> FEATURE:
<223> OTHER INFORMATION: Synthetic

<400> SEQUENCE: 10
cagaactcaa aggtcgtgtc                                              20

<210> SEQ ID NO 11
<211> LENGTH: 39
<212> TYPE: DNA
<213> ORGANISM: Artificial Sequence
<220> FEATURE:
<223> OTHER INFORMATION: Synthetic

<400> SEQUENCE: 11
ctctagagga tccccttatc cacctgcccg ttttagcac                         39

<210> SEQ ID NO 12
<211> LENGTH: 40
<212> TYPE: DNA
<213> ORGANISM: Artificial Sequence
<220> FEATURE:
<223> OTHER INFORMATION: Synthetic

<400> SEQUENCE: 12
tcgagctcgg tacccataac ctctgtgtta ctgaccgtgc                        40

<210> SEQ ID NO 13
<211> LENGTH: 39
<212> TYPE: DNA
<213> ORGANISM: Artificial Sequence
<220> FEATURE:
<223> OTHER INFORMATION: Synthetic

<400> SEQUENCE: 13
gcacaaggac acatcccgaa ggtcatggtg ttcccggtg                         39

<210> SEQ ID NO 14
<211> LENGTH: 39
<212> TYPE: DNA
<213> ORGANISM: Artificial Sequence
<220> FEATURE:
<223> OTHER INFORMATION: Synthetic

<400> SEQUENCE: 14
agaaggtcat ggcatacaag ccagatcaag ttcgtcatg                         39

<210> SEQ ID NO 15
<211> LENGTH: 25
<212> TYPE: DNA
```

```
<213> ORGANISM: Artificial Sequence
<220> FEATURE:
<223> OTHER INFORMATION: Synthetic

<400> SEQUENCE: 15
atgccatgac cttcttccaa gtgtg                                              25

<210> SEQ ID NO 16
<211> LENGTH: 25
<212> TYPE: DNA
<213> ORGANISM: Artificial Sequence
<220> FEATURE:
<223> OTHER INFORMATION: Synthetic

<400> SEQUENCE: 16
gatgtgtcct tgtgcttgcc tgaag                                              25

<210> SEQ ID NO 17
<211> LENGTH: 20
<212> TYPE: DNA
<213> ORGANISM: Artificial Sequence
<220> FEATURE:
<223> OTHER INFORMATION: Synthetic

<400> SEQUENCE: 17
tcggtggact cagctgctcc                                                    20

<210> SEQ ID NO 18
<211> LENGTH: 20
<212> TYPE: DNA
<213> ORGANISM: Artificial Sequence
<220> FEATURE:
<223> OTHER INFORMATION: Synthetic

<400> SEQUENCE: 18
tgaatgtgta ggcagaggtg                                                    20

<210> SEQ ID NO 19
<211> LENGTH: 25
<212> TYPE: DNA
<213> ORGANISM: Artificial Sequence
<220> FEATURE:
<223> OTHER INFORMATION: Synthetic

<400> SEQUENCE: 19
agctttcctc tcttcaggca agcac                                              25

<210> SEQ ID NO 20
<211> LENGTH: 25
<212> TYPE: DNA
<213> ORGANISM: Artificial Sequence
<220> FEATURE:
<223> OTHER INFORMATION: Synthetic

<400> SEQUENCE: 20
acatttaagg attctacaca cttgg                                              25

<210> SEQ ID NO 21
<211> LENGTH: 24
<212> TYPE: DNA
<213> ORGANISM: Artificial Sequence
<220> FEATURE:
<223> OTHER INFORMATION: Synthetic

<400> SEQUENCE: 21
agaggagcgg acactgaatt ttgg                                               24
```

```
<210> SEQ ID NO 22
<211> LENGTH: 24
<212> TYPE: DNA
<213> ORGANISM: Artificial Sequence
<220> FEATURE:
<223> OTHER INFORMATION: Synthetic

<400> SEQUENCE: 22
gttcatgtga gggtggttgc cacg                                          24
```

MONOACYLATED MEL-PRODUCING MICROORGANISM

INCORPORATION-BY-REFERENCE OF MATERIAL ELECTRONICALLY SUBMITTED

Incorporated by reference in its entirety herein is a computer-readable nucleotide/amino acid sequence listing submitted concurrently herewith and identified as follows: 19,401 bytes ASCII (Text) file named "763424Sequence-Listing-3rd-ST25.txt." created Aug. 13, 2025.

TECHNICAL FIELD

Yeast for producing a biosurfactant (more specifically, monoacylated MEL) and a technique for producing a monoacylated MEL using such yeast are disclosed.

BACKGROUND ART

Biosurfactants are natural surfactants produced by microorganisms. Biosurfactants are highly biodegradable, have a low environmental impact, and possess a variety of beneficial physiological functions. Their use in the food industry, cosmetics industry, pharmaceutical industry, chemical industry, environmental industry, and like industrial fields is significant in realizing an environmentally harmonious society.

Biosurfactants can be classified into five groups: glycolipid biosurfactants, acyl peptide biosurfactants, phospholipid biosurfactants, fatty acid biosurfactants, and polymeric biosurfactants. Among these, glycolipid surfactants have been most well studied. Known as such glycolipid biosurfactants are mannosylerythritol lipids (hereinafter also referred to as MELs) in which a fatty acid is ester-linked to mannosylerythritol in which erythritol is glycosidically linked to mannose (hereinafter also referred to as ME); rhamnolipids, ustilagic acids, trehalose lipids, sophorose lipids, and the like.

MELs have various structures that are different in positions and number of fatty acid residues and acetyl groups that are bound. FIG. 1 shows a structural formula of a MEL wherein $R_1$ to $R_5$ each represent a hydrogen atom, an acetyl group, or a $C_{3-18}$ fatty acid residue. The structure in which $R_1$ and $R_2$ are fatty acid residues and $R_3$ and $R_4$ are acetyl groups is defined as MEL-A. The structure in which $R_3$ is a hydrogen atom and $R_4$ is an acetyl group is defined as MEL-B. The structure in which $R_3$ is an acetyl group and $R_4$ is a hydrogen atom is defined as MEL-C. The structure in which $R_3$ and $R_4$ are hydrogen atoms is defined as MEL-D. As shown in FIGS. 2(a) and 2(b), the structure of the obtained ME is different depending on whether the hydroxymethyl group of erythritol bound to mannose is derived from the carbon at 1-position or the carbon at 4-position. The MEL that has, as a sugar backbone, 4-O-β-D-mannopyranosyl-erythritol shown in FIG. 2(a) is referred to as 4-O-β-D-MEL. *Pseudozyma tsukubaensis* is known to produce 1-O-β-D-MEL-B, which has, as a sugar backbone, 1-O-β-D-mannopyranosyl-erythritol shown in FIG. 2(b). The 1-O-β-MEL-B is characterized by having enhanced hydrating properties and high vesicle-forming ability as compared to 4-O-β-MEL-B, and is a promising biomaterial for skincare products etc.

It has been reported that when MEL-producing yeast is cultured using only glucose as a carbon source, monoacylated MELs (single-chain MEL), which are MELs shown in FIG. 1 wherein a fatty acid is bound to only $R_2$ and $R_1$, $R_3$, and $R_4$ are hydrogen atoms, can be produced (Non-patent Literature (NPL) 1). This monoacylated MEL has enhanced hydrophilicity as compared to conventional diacylated MELs (Non-patent Literature (NPL) 1).

The MEL biosynthetic pathway has already been reported. MEL is synthesized intracellularly by the reaction of glycosyltransferase, which binds mannose and erythritol; acyltransferase, which binds fatty acids; and acetyltransferase, which binds acetyl groups (Non-patent Literature (NPL) 2).

The present inventors found that deletion of the gene for acyltransferase from a microorganism capable of producing a biosurfactant yields monoacylated MELs with an aliphatic acyl group bound to only R in the structural formula shown in FIG. 1 (Patent Literature (PTL) 1).

CITATION LIST

Patent Literature

PTL 1: Japanese Patent Application No. 2016-191438

Non-Patent Literature

NPL 1: Fukuoka et al., Appl. Microbiol. Biotechnol. (2007) 76: 801-810.
NPL 2: Hewald et al., Appl. Environ. Microbiol. (2006) 72:5469-5477

SUMMARY OF INVENTION

Technical Problem

Under the circumstances described above, an object is to provide a novel MEL.

Solution to Problem

To achieve the object, the inventors conducted extensive research and found that a monoacylated MEL represented by the structural formula shown in FIG. 1 having an aliphatic acyl group only at Ry and an acetyl group or a hydroxyl group at $R_4$ can be obtained by deleting the transporter gene of a microorganism capable of producing a biosurfactant. As a result of further research and consideration based on this finding, the inventors provided the inventions represented below.

Item 1.
A microorganism of the genus *Pseudozyma* producing monoacylated MEL-B.

Item 2.
The microorganism according to Item 1, wherein the microorganism is deficient in a gene encoding a transporter (PtMMF1).

Item 3.
The microorganism according to Item 1 or 2, further producing monoacylated MEL-D.

Item 4.
The microorganism according to any one of Items 1 to 3, wherein the microorganism is *Pseudozyma tsukubaensis*.

Item 5.
A method for producing monoacylated MEL-B by using the microorganism of any one of Items 1 to 4.

Item 6.
A MEL-containing composition obtained by culturing the microorganism of any one of Items 1 to 4.

Advantageous Effects of Invention

A technique for producing monoacylated MEL-B is provided.

DESCRIPTION OF EMBODIMENTS

Figure 1:
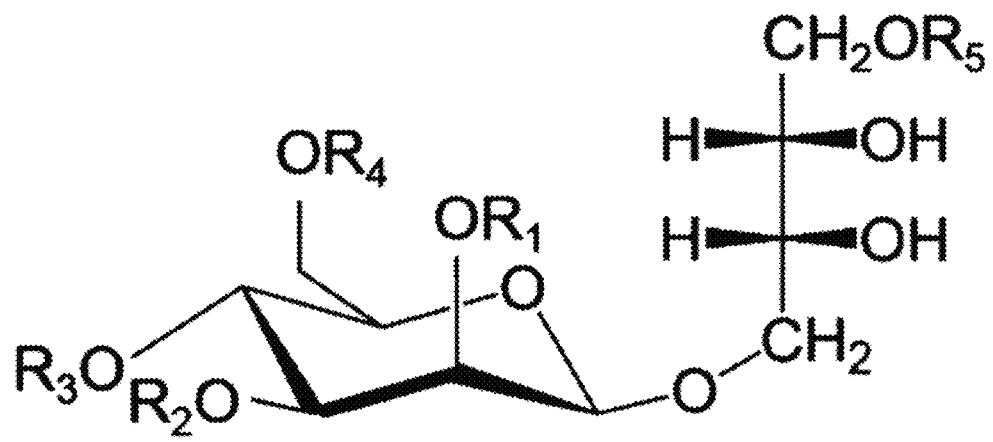
FIG. 1 shows the structure of MEL.
Figure 2:
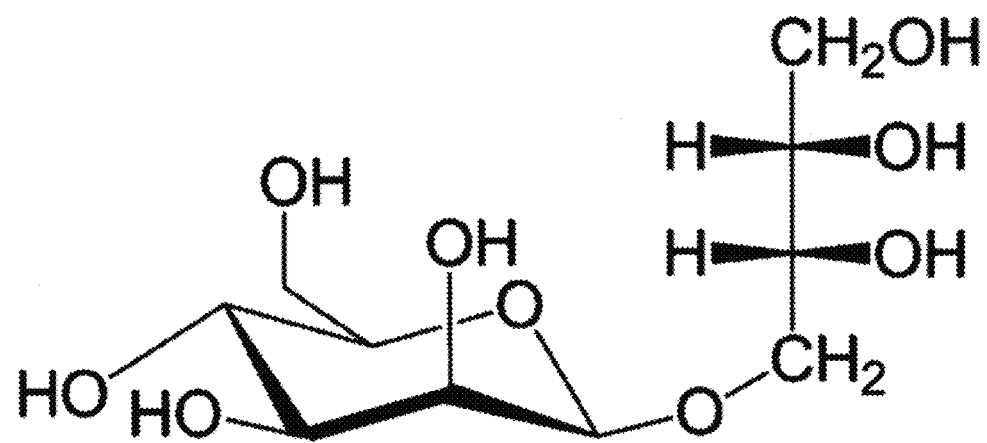
FIG. 2 shows the structures of 4-O-β-D-mannopyranosyl-erythritol (a) and 1-O-β-D-mannopyranosyl-erythritol (b).
Figure 2:
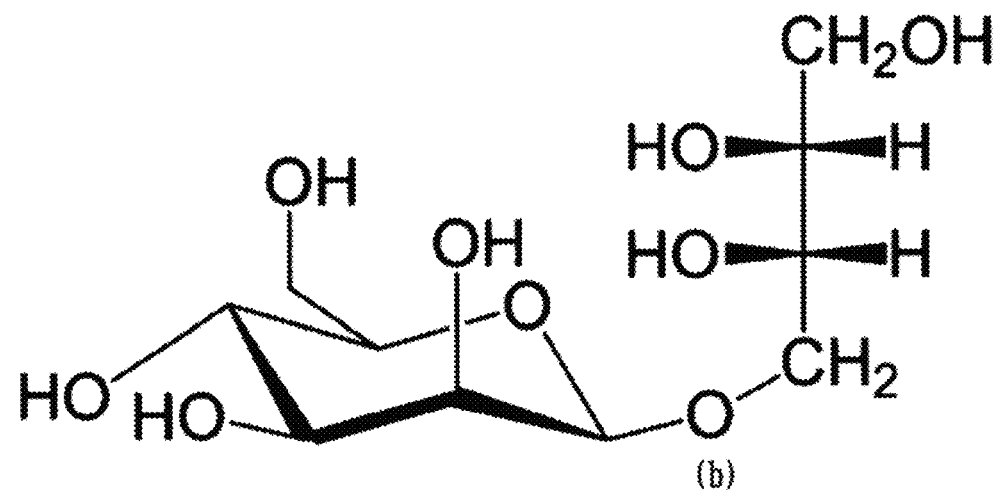

The microorganism preferably produces monoacylated MEL-B. As described above, monoacylated MEL-B has the structure of the formula shown in FIG. 1 in which $R_1$ is a $C_{2-24}$ aliphatic acyl group, $R_2$ is a hydrogen atom, $R_3$ is a hydrogen atom, and $R_4$ is an acetyl group. The aliphatic acyl group preferably has 2 to 24 carbon atoms, and more preferably 6 to 14 carbon atoms.

The microorganism that produces monoacylated MEL-B can be of any type. In one embodiment, the monoacylated MEL-B-producing microorganism is preferably a microorganism that belongs to the genus *Pseudozyma, Moesziomyces, Ustilago, Sporisorium, Melanopsichium,* or *Kurtzmanomyces*. Examples of preferred microorganisms that belong to the genus *Pseudozyma* include *Pseudozyma antarctica* (*Moesziomyces antarcticus*), *Pseudozyma parantarctica, Pseudozyma rugulosa, Pseudozyma siamensis, Pseudozyma shanxiensis, Pseudozyma crassa, Pseudozyma churashimaensis, Pseudozyma aphidis* (*Moesziomyces aphidis*), *Pseudozyma hubeiensis,* and *Pseudozyma tsukubaensis*. Examples of preferred microorganisms that belong to the genus *Moesziomyces* include *Moesziomyces antarcticus* and *Moesziomyces aphidis*. Examples of preferred microorganisms that belong to the genus *Ustilago* include *Ustilago hordei* and *Ustilago maydis*. Examples of preferred microorganisms that belong to the genus *Sporisorium* include *Sporisorium reilianum* and *Sporisorium scitamineum*. Examples of preferred microorganisms that belong to the genus *Melanopsichium* include *Melanopsichium pennsylvanicum*. Examples of preferred microorganisms that belong to the genus *Kurtzmanomyces* include *Kurtzmanomyces* sp. I-11. In one preferred embodiment, the MEL-producing microorganism is a microorganism of the genus *Pseudozyma*, more preferably a microorganism that belongs to *Pseudozyma tsukubaensis*, and more specifically *Pseudozyma tsukubaensis* 1E5 (JCM16987 strain), NBRC1940 (ATCC24555, CBS422.96, CBS6389, DBVPG6988, PYCC4855, JCM10324, MUCL29894, NCYC1510, NRRLY-7792). Microorganisms that belong to *Pseudozyma tsukubaensis* are known to selectively produce 1-O-β-MEL-B.

In one embodiment, the monoacylated MEL-producing microorganism can be obtained by mutating a microorganism that produces a conventional MEL. Here, the conventional MEL is diacylated MEL. The type of mutation is not limited, and is preferably a mutation that disrupts a gene encoding a transporter possessed by a MEL-producing microorganism. Gene disruption means that a protein encoded by a gene (e.g., a transporter) ceases to function. The mode of disruption is not particularly limited. In one embodiment, the monoacylated MEL-producing microorganism can be obtained by disrupting a gene encoding a transporter possessed by a MEL-producing microorganism. MEL-producing microorganisms typically have a transporter (MMF1).

Gene disruption can be performed by any method. For example, gene disruption can be performed by introducing a mutation into the nucleotide sequence of a gene, disrupting or deleting the expression control region (promoter etc.) of the gene, or inhibiting the translation of a transcript of the gene. These can be performed by a technique using, for example, homologous recombination, transposon, transgene, post-transcriptional gene silencing, RNAi, nonsense-mediated decay (NMD), ribozyme, antisense, miRNA (micro-RNA), or siRNA (small interfering RNA).

In one embodiment, gene disruption is preferably performed by homologous recombination. Methods for disrupting genes by homologous recombination are known. For example, disruption of a target gene by homologous recombination can be performed by the method including the following: creating a gene cassette in which a selection marker gene, such as a gene that complements drug resistance or auxotrophy, is inserted into the ORF of the target gene; incorporating the gene cassette into an appropriate vector (e.g., a plasmid); and introducing the resulting vector into a host microorganism (e.g., a conventional MEL-producing microorganism) to insert a marker gene into the target gene by homologous recombination. A microorganism whose target gene has been disrupted can be selected based on the expression of the above marker gene.

The marker gene to be used in homologous recombination can be selection marker genes for transformants that are usually used in genetic engineering. Examples include genes that confer resistance to drugs, such as hygromycin, zeocin, kanamycin, chloramphenicol, and G418; and genes that complement auxotrophy, such as uracil synthase, leucine synthase, adenine synthase, and lysine synthase.

In one embodiment, the target gene is preferably an MMF1 gene. Examples of representative MMF1 genes are as follows. SEQ ID NO: 1 is a nucleotide sequence encoding a transporter (PaMMF1) derived from *Pseudozyma antarctica* T34 strain. SEQ ID NO: 2 is a nucleotide sequence encoding a transporter (PaMMF1) derived from *Pseudozyma antarctica* JCM10317 strain. SEQ ID NO: 3 is a nucleotide sequence encoding a transporter (PhMMF1) derived from *Pseudozyma hubeiensis* SY62 strain. SEQ ID NO: 4 is a nucleotide sequence encoding a transporter (PtMMF1) derived from *Pseudozyma tsukubaensis* NBRC1940 strain. SEQ ID NO: 5 is a nucleotide sequence encoding a transporter (PtMMF1) derived from *Pseudozyma tsukubaensis* strain 1E5 strain. SEQ ID NO: 6 is a nucleotide sequence encoding a transporter (MMF1) derived from *Pseudozyma aphidis* DSM70725 strain. Based on the information of these sequences, a vector for disrupting a transporter gene can be constructed. *P. antarctica* T-34 is also referred to as "*Moesziomyces antarcticus* T-34." *P. aphidis* is also referred to as "*Moesziomyces aphidis.*"

The vector for use in gene disruption can be of any type and can be suitably selected according to the type of the host. Examples of vectors for use when a microorganism of the genus *Pseudozyma* is used as a host include pUXV1 ATCC 77463, pUXV2 ATCC 77464, pUXV5 ATCC 77468, pUXV6 ATCC 77469, pUXV7 ATCC 77470, pUXV8 ATCC 77471, pUXV3 ATCC 77465, pU2X1 ATCC 77466, pU2X2 ATCC 77467, pTA2, pUXV1-neo, pPAX1-neo, pPAA1-neo (Appl. Microbiol. Biotechnol. (2016) 100:3207-3217), pUC_neo, and pUC$_T$_neo.

The introduction of the vector into a host cell can be performed by any method that can be suitably selected according to the type of the host cell, vector, etc. For example, the introduction of the vector can be performed by electroporation, calcium phosphate co-precipitation, lipofection, microinjection, or the lithium acetate method.

The microorganism preferably produces monoacylated MEL-D in addition to monoacylated MEL-B. Such a microorganism can also be obtained by the transporter gene disruption described above. In an embodiment, the microorganism preferably produces monoacylated MEL-B, monoacylated MEL-D, and diacylated MEL-B. Such a microorganism can also be obtained by the transporter gene disruption described above.

The production of monoacylated MEL-B, monoacylated MEL-D, and/or diacylated MEL-B by using the microorganisms described above can be performed by any method. For example, monoacylated MEL-B, monoacylated MEL-D, and/or diacylated MEL-B can be produced by culturing the microorganisms described above in a medium suitable for culturing a MEL-producing microorganism. The medium to be used is not particularly limited. For example, a carbohydrate, such as glucose, sucrose, or blackstrap molasses, is preferably used as a carbon source. In addition to, or in place of, a carbohydrate, fat and/or oil can also be used as a carbon source. The fat and/or oil can be of any kind. For example, vegetable fat and oil, fatty acids, or esters thereof are preferably added.

In one embodiment, adding vegetable fat and/or oil to the culture medium is preferred. The vegetable oil can be of any kind, and can be appropriately selected according to, for example, the type of target MEL. Examples of vegetable fats and oils include soybean oil, olive oil, rapeseed oil, safflower oil, sesame oil, palm oil, sunflower oil, coconut oil, cocoa butter, and castor oil. Examples of fatty acids include caprylic acid, capric acid, lauric acid, myristic acid, palmitic acid, stearic acid, oleic acid, linoleic acid, linolenic acid, arachidonic acid, behenic acid, and nervonic acid. In one embodiment, a preferred fatty acid is oleic acid.

In one embodiment, microorganisms that produce monoacylated MEL-B, monoacylated MEL-D, and/or diacylated MEL-B can be cultured in a medium containing only glucose as a carbon source. As a nitrogen source, a combination of an organic nitrogen source and an inorganic nitrogen source can be used. As the organic nitrogen source, for example, one member or a combination of two or more members selected from the group consisting of yeast extracts, malt extracts, peptone, polypeptone, corn steep liquor, casamino acid, and urea can be used.

As the inorganic nitrogen source, one member or a combination of two or more members selected from the group consisting of sodium nitrate, potassium nitrate, ammonium nitrate, ammonium sulfate, and ammonia can be used. In another embodiment, a method of producing monoacylated MEL-B, monoacylated MEL-D, and/or diacylated MEL-B is provided, which comprises culturing the microorganisms described above in a medium containing fatty acid and glycerin.

The amount of fatty acid and the amount of fat and/or oil are not particularly limited. For example, fatty acid and fat and/or oil can be added in such an amount as for each to achieve a concentration of 0.1 to 40 volume % in the medium.

The conditions for culturing the microorganism are not particularly limited. For example, culture can be performed at pH 5 to 8, preferably pH 6, and at a temperature of 20 to 35° C., preferably 22 to 28° C., for 3 to 7 days.

The extraction of monoacylated MEL-B, monoacylated MEL-D, and/or diacylated MEL-B produced by the microorganisms described above can be performed by any method. For example, monoacylated MELs can be obtained by a method comprising centrifuging a culture broth or a disrupted yeast cell suspension, collecting the supernatant, adding an appropriate extraction solvent to the supernatant, collecting the extraction solvent layer, and optionally further performing purification. In one embodiment, the extraction solvent for use in extracting monoacylated MEL is preferably at least one member selected from the group consisting of ethyl acetate, methanol, ethanol, acetone, and a mixture thereof.

The cultured product (or its extract) obtained by culturing the microorganisms above is preferably a composition containing monoacylated MEL-B, a composition containing monoacylated MEL-B and monoacylated MEL-D, or a composition containing monoacylated MEL-B, monoacylated MEL-D, and diacylated MEL-B. In one embodiment, the MEL-containing composition preferably contains monoacylated MEL-B, monoacylated MEL-D, and diacylated MEL-B, and the percentage of each MEL in the total amount of MELs is preferably about 50 mass % for monoacylated MEL-B, about 17 mass % for monoacylated MEL-D, and about 33 mass % for diacylated MEL-B. Such a MEL-containing composition (MEL mixture) can be dissolved at a higher concentration in an aqueous solvent.

EXAMPLES

The present invention is described below in more detail with reference to Examples. However, the present invention is not limited to these Examples.
Materials
Yeast Cells Used
*Pseudozyma tsukubaensis* 1E5 strain (JCM16987)
Media
YM medium: the medium was prepared by dissolving 3 g of a yeast extract, 3 g of a malt extract, 5 g of peptone, and 10 g of glucose in 1 L of deionized water. 20 g of agar was added as necessary to prepare an agar medium.

YM medium with glycerol: the medium was prepared by dissolving 3 g of a yeast extract, 3 g of a malt extract, 5 g of peptone, 10 g of glucose, and 50 g of glycerol in 1 L of deionized water.

MEL production medium: the medium was prepared by dissolving 5 g of a yeast extract, 3 g of sodium nitrate, 0.3 g of potassium dihydrogen phosphate, 0.3 g of magnesium sulfate hemihydrate, and 20 g of glycerol in 1 L of deionized water.

5-FOA agar medium: the medium was prepared by dissolving 1.7 g of a yeast nitrogen base w/o AA, 5 g of ammonium sulfate, 20 g of glucose, 0.5 g of uracil, 2 g of 5-FOA, and 20 g of agar in 1 L of deionized water.

1. Acquisition of Uracil Auxotroph

A platinum loop of *Pseudozyma tsukubaensis* 1E5 strain was inoculated into 2 ml of a YM medium and cultured with shaking at 25° C. at 180 rpm for 24 hours. The culture broth was spread on a petri dish, and the plate was placed 45 cm apart from a UV lamp (GL15 germicidal lamp, Panasonic Corporation). The plate was irradiated with UV, and 0.2 ml of the culture broth was collected. The collected culture broth was incubated at 25° C. for 3 hours and inoculated on a 5-FOA agar medium by coating. The inoculated plate was incubated at 25° C. for 10 days to grow colonies. Colonies grown on the 5-FOA agar medium were subcultured onto a YM agar medium with a toothpick, and some of the yeast cells were subjected to colony PCR and sequence analysis. The PCR primers for use had the following nucleotide sequences.

```
seq_PtURA3_F1:
                                              (SEQ ID NO: 7)
GCTGCTGTGTCCGCTGCACG seq_PtURA3_F2:
                                              (SEQ ID NO: 8)
GAGATGTCGTCGGCTGGAGC seq_PtURA5_F1:
                                              (SEQ ID NO: 9)
GAGTGCCGACGGTGGACGTC seq_PtURA5_F2:
                                              (SEQ ID NO: 10)
CAGAACTCAAAGGTCGTGTC
```

The results of sequence analysis indicated that the PtURA5 gene had a mutation incorporated. The obtained uracil auxotrophic mutant was subjected to an auxotrophy test and confirmed to have uracil auxotrophy. The uracil auxotroph was also confirmed to maintain a MEL-production ability.

2. Acquisition of Disrupted PtMMF1 Gene Strain

2-1. Construction of PtMMF1 Vector

The PtMMF1 gene region (including the upstream and downstream 2 kb of the gene) was amplified by PCR using the genomic DNA of *Pseudozyma tsukubaensis* 1E5 strain as a template. The primers used for PCR had the following nucleotide sequences.

```
PtMMF1_pUC18_IF_F:
                                              (SEQ ID NO: 11)
CTCTAGAGGATCCCCTTATCCACCTGCCCGTTTTAGCAC

PtMMF1_pUC18_IF_R:
                                              (SEQ ID NO: 12)
TCGAGCTCGGTACCCATAACCTCTGTGTTACTGACCGTGC
```

The amplified DNA fragment was linked to a pUC18 vector to prepare a pUC-PtMMF1 vector.

2-2. Construction of PtMMF1—Disrupted Vector

The PtURA5 gene region (including the upstream 1 kb and downstream 0.5 kb of the gene) was amplified by PCR using the genomic DNA of *Pseudozyma tsukubaensis* 1E5 strain as a template, thereby obtaining a PtURA5 gene fragment. The primers used for PCR had the following nucleotide sequences.

```
PtMMF1_URA5_IF_F:
                                              (SEQ ID NO: 13)
GCACAAGGACACATCCCGAAGGTCATGGTGTTCCCGGTG

PtMMF1_URA5_IF_R:
                                              (SEQ ID NO: 14)
AGAAGGTCATGGCATACAAGCCAGATCAAGTTCGTCATG
```

Subsequently, a linearized pUC-PtMMF1 vector was amplified by PCR using the pUC-PtMMF1 vector as a template, thereby obtaining a gene fragment. The primers used for PCR had the following nucleotide sequences.

```
PtMMF1_pUC18_inverse_F:
                                              (SEQ ID NO: 15)
ATGCCATGACCTTCTTCCAAGTGTG PtMMF1_pUC18_inverse_R:
                                              (SEQ ID NO: 16)
GATGTGTCCTTGTGCTTGCCTGAAG
```

Figure 3:
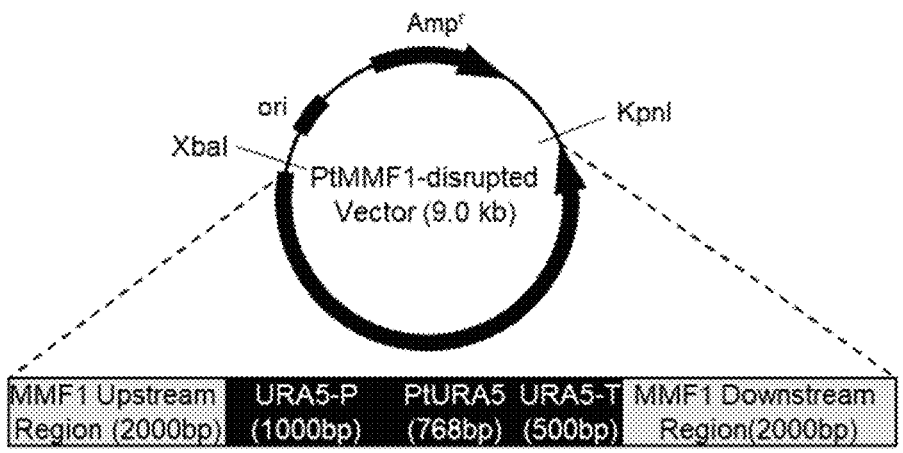
FIG. 3 shows a PtMMF1-disrupted vector.

The obtained linearized pUC-PtMMF1 vector was linked to a PtURA5 gene fragment, thereby preparing a PtMMF1-disrupted vector. The sequence analysis of the PtMMF1-disrupted vector indicated the incorporation of a target fragment. FIG. 3 shows the structure of the PtMMF1-disrupted vector. In FIG. 3, URA5-P indicates the upstream region (1 kb) of the PtURA5 gene, and URA5-T indicates the downstream region (0.5 kb) of the PtURA5 gene.

2-3. Preparation of Transformant

The PtMMF1-disrupted vector obtained in section 2-2 above was treated with restriction enzyme KpnI and XbaI and thus linearized, followed by transformation into the uracil auxotroph obtained in section 1 above by electroporation. The selection of the transformant was performed by using the loss of uracil auxotrophy. Colony PCR and sequence analysis confirmed that the target DNA fragment was incorporated at the target genome position by homologous recombination. The primers used for PCR had the following nucleotide sequences.

```
Primer pair A_F:
                                              (SEQ ID NO: 17)
TCGGTGGACTCAGCTGCTCC Primer pair A_R:
                                              (SEQ ID NO: 18)
TGAATGTGTAGGCAGAGGTG Primer pair B_F:
                                              (SEQ ID NO: 19)
AGCTTTCCTCTCTTCAGGCAAGCAC Primer pair B_R:
                                              (SEQ ID NO: 20)
ACATTTAAGGATTCTACACACTTGG Primer pair C_F:
                                              (SEQ ID NO: 21)
AGAGGAGCGGACACTGAATTTTGG Primer pair C_R:
                                              (SEQ ID NO: 22)
GTTCATGTGAGGGTGGTTGCCAGG
```

Figure 4:
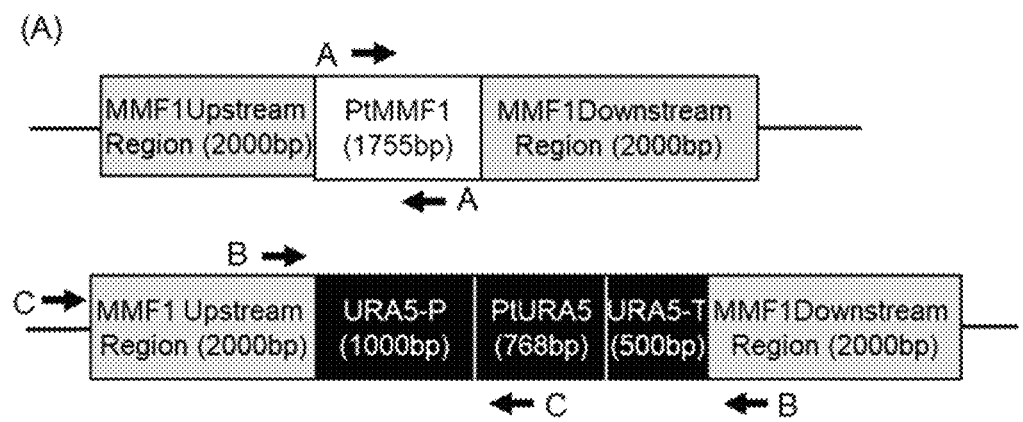
FIG. 4 shows the results of colony PCR of transformants.
Figure 4:
Figure 4:
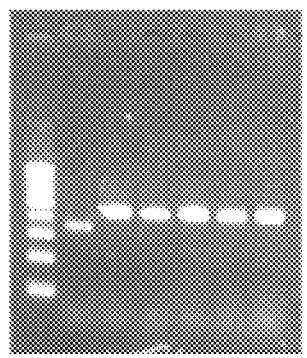
Figure 4:
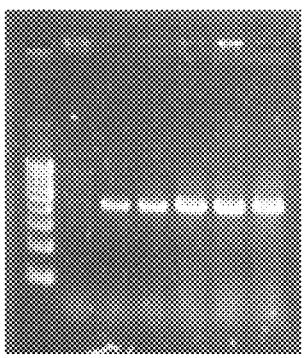

FIG. 4 shows the results of colony PCR of the transformant. In FIG. 4, ΔPtMMF1 indicates the PtMMF1-disrupted strain, and the arrows indicate primers. In FIG. 4, (A) indicates the binding sites of the primers for use in colony PCR, (B) indicates the results of colony PCR by using primer pair A, (C) indicates the results of colony PCR by using primer pair B, and (D) indicates the results of colony PCR by using primer pair C. Colony PCR resulted in five mutant strains with disruption of the PtMMF1 gene.

3. Evaluation of Product of PtMMF1 Gene-Disrupted Strain 3-1. Culture of PtMMF1 Gene-Disrupted Strain Five PtMMF1 gene-disrupted strains were each cultured with shaking in 2 mL of an YM medium with glycerol at 25° C. at 250 rpm for 2 days to obtain a pre-culture broth. Subsequently, 1 mL of the pre-culture broth was inoculated into 20 mL of a medium prepared by adding 6% olive oil to a MEL-producing medium and cultured with shaking at 25° C. at 250 rpm for 7 days.

3-2. Extraction of Cultured Product of PtMMF1 Gene-Disrupted Strain

The yeast cell culture broth obtained in section 3-1 above was centrifuged at 3,000 rpm, and the culture supernatant was collected. The collected supernatant was frozen at −20° C. and then freeze-dried. Acetone was added to the dried supernatant, and the mixture was stirred by vortexing and then allowed to stand at room temperature overnight. Thereafter, the acetone layer was collected and filtered through a 0.45 μm filter. The obtained filtrate was used as an acetone extract.

3-3. Evaluation of MEL in the Extract

The MELs in each acetone extract were analyzed by thin-layer chromatography (TLC). The composition of the developing solvent was chloroform:methanol: 12% ammonia water=55:25:2. A 2% anthrone sulfate reagent was sprayed over TLC plates after development, and the developed TLC plates were heated at 95° C. for 5 minutes to detect spots of MELs.

Figure 5:
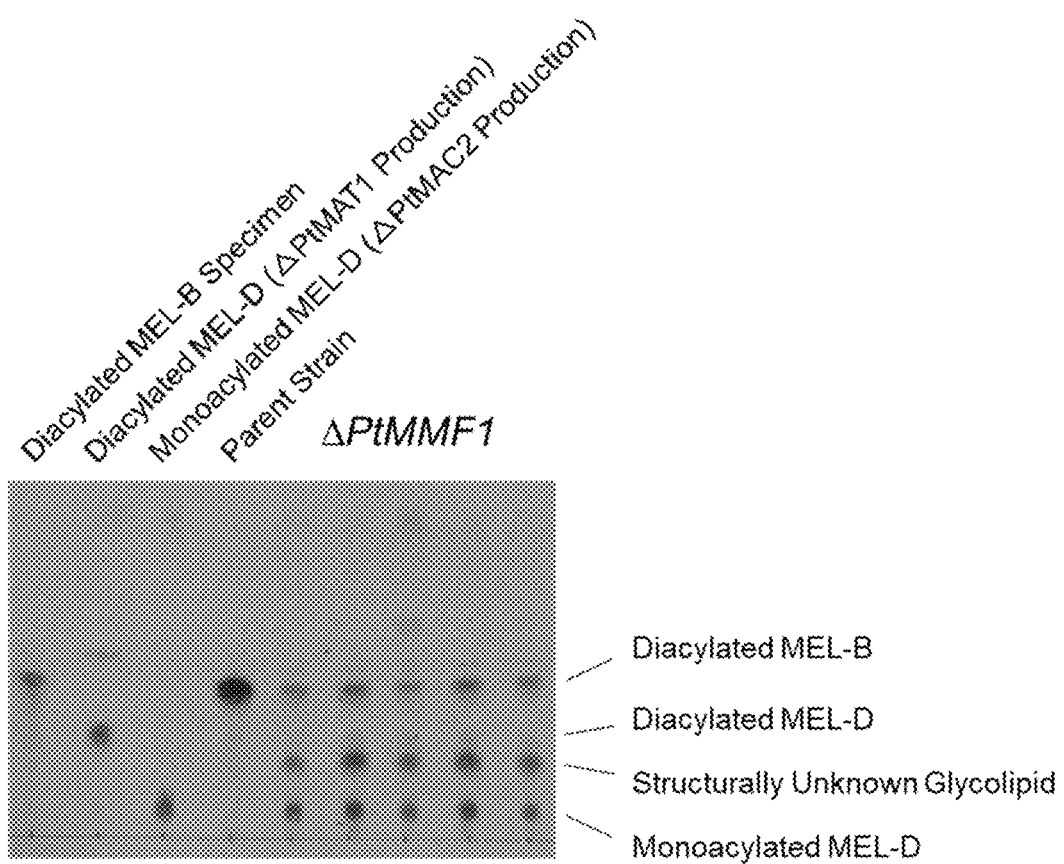
FIG. 5 shows the results of analyzing a cultured product of a PtMMF1-disrupted strain by thin-layer chromatography.

FIG. 5 shows the results of the culture of the PtMMF1 gene-disrupted strains. In FIG. 5, ΔPtMAT1 indicates a PtMAT1-disrupted strain, ΔPtMAC2 indicates a PtMAC2-disrupted strain, and ΔPtMMF1 indicates a PtMMF1-disrupted strain. The analysis confirmed that the production of diacylated MEL-B was decreased in the PtMMF1 gene-disrupted strain, and instead monoacylated MEL-D and a glycolipid of unknown structure were predominant.

4. Analysis of Glycolipid of Unknown Structure 4-1. Analysis by High-Performance Liquid Chromatography-Mass Spectrometry (LC-MS)

A sample obtained by extracting a cultured product of the PtMMF1 gene-disrupted strain with acetone was analyzed by LC-MS. The conditions for analysis were as follows.

Figure 6:
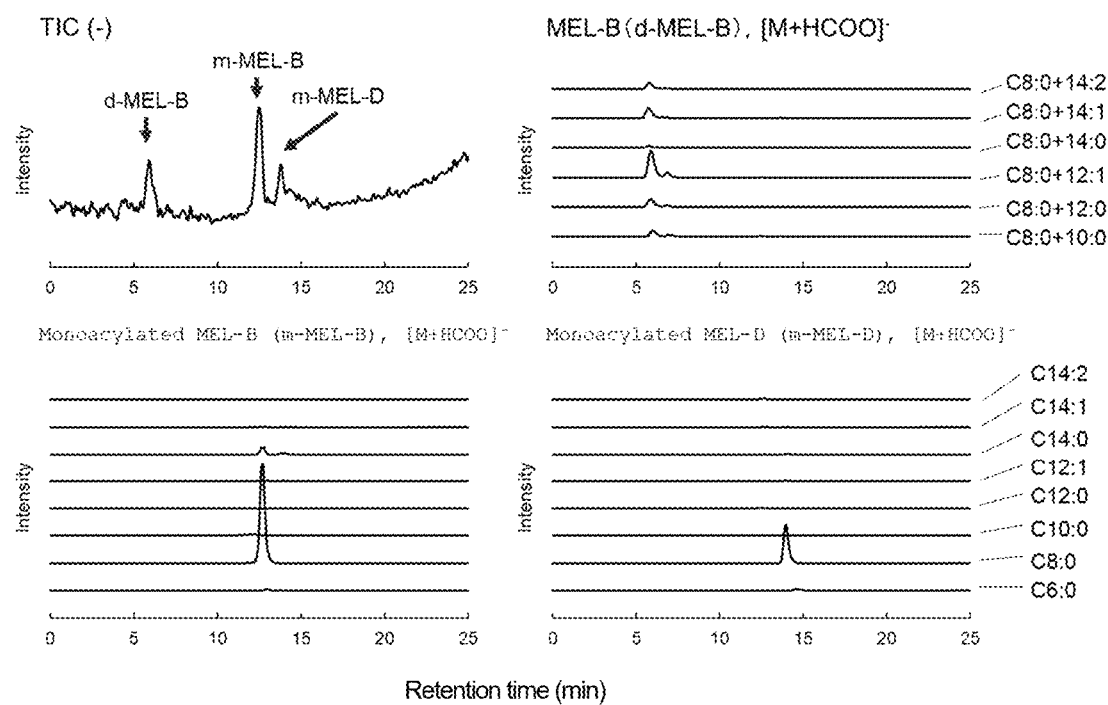
FIG. 6 shows the results of analyzing a cultured product of a PtMMF1-disrupted strain with a high-performance liquid chromatography-mass spectrometer.

HPLC conditions
Column: Asahipak NH2P-40-2D (produced by Shodex)
Mobile phase A: 10 mM ammonium formate
Mobile phase B: acetonitrile
Gradient: A: B=5:95 at the start of analysis, A: B=60:40 for 20 minutes during analysis, A: B=5:95 from 20.1 minutes to the end of analysis (35 minutes)
Flow rate: 0.1 mL/min
Column temperature: 25° C.
Sample injection volume: 5 uL
MS conditions
Ionization mode: DUIS
Scanned Area: 50-2000 m/z FIG. 6 shows the results of LC-MS analysis. As shown in FIG. 6, the mass number of the structurally unknown MEL produced by the PtMMF1-disrupted strain was found to match a formate ion adduct of monoacylated MEL-B (caprylic acid adduct).

4-2. Analysis of Nuclear Magnetic Resonance Spectroscopy (NMR)

An acetone extract was subjected to open column using a silica gel column (Wakosil C-200, produced by Fujifilm Wako Pure Chemical Corporation) to purify the structurally unknown MEL. The solvents used were chloroform and acetone.

Figure 7:
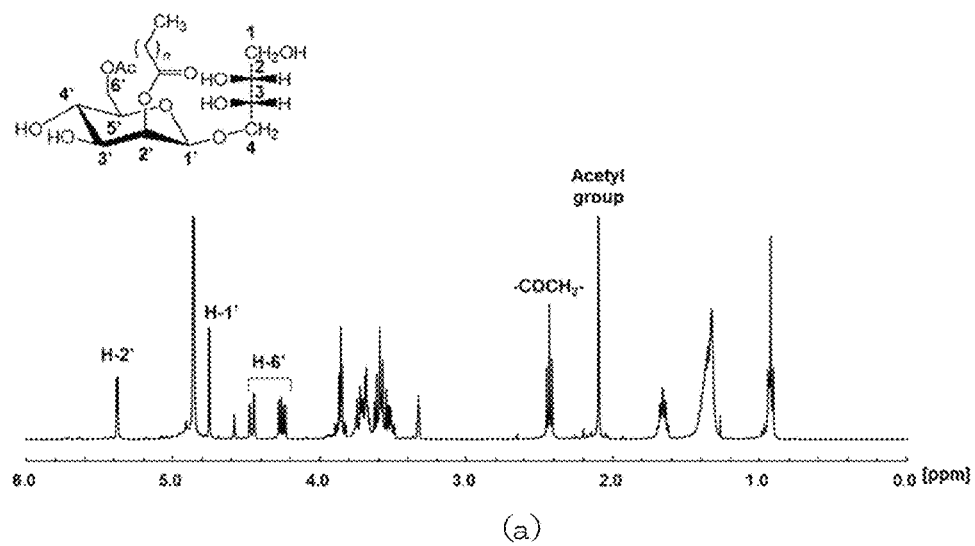
FIG. 7 shows the results of analyzing a cultured product of a PtMMF1-disrupted strain by nuclear magnetic resonance spectroscopy.
Figure 7:
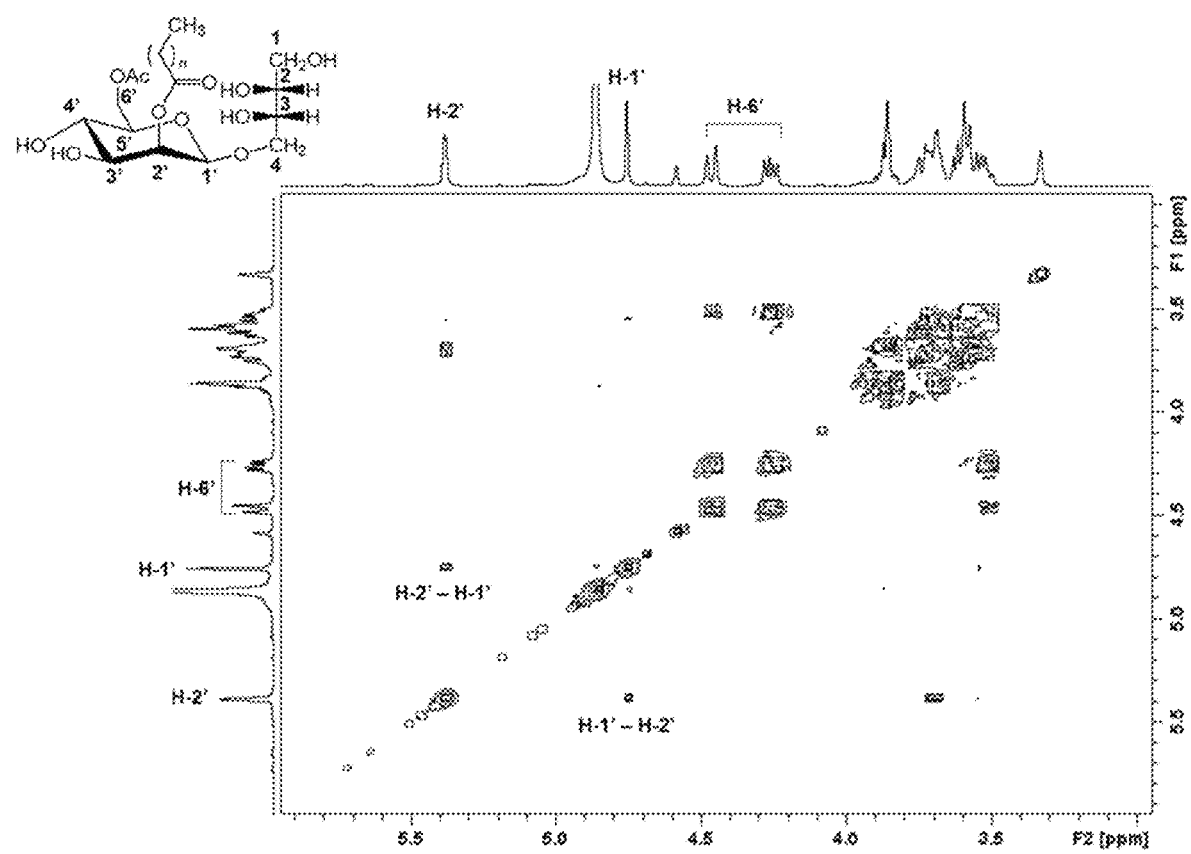

50 mg of the structurally unknown MEL purified by a silica gel column was dissolved in 1 mL of d4-methanol, followed by analyzing it with a Bruker Avance 400 (400 MHZ). FIG. 7 (a) and 7 (b) show the results of 1H-NMR and 2D NMR (COSY). As shown in FIG. 7, a single signal derived from the proton of an acetyl group was detected around 2.10 ppm, and its integral ratio to the signal of mannose position 1 (4.75 ppm) was 1:3; thus, the structurally unknown MEL was found to be a monoacetylated MEL having a single acetyl group bound. Additionally, the signal (2.43 ppm) of —COCH$_2$— had an integral ratio of 1:2 to the signal of mannose position 1 (4.75 ppm); thus, the structurally unknown MEL was found to be a monoacylated MEL having a single fatty acid chain bound.

As shown in FIG. 7, the signal of mannose position 6 was shifted in the low-field (4.23-4.48 ppm), and additionally, the parent strain of the PtMMF1-disrupted strain, i.e., P. tsukubaensis 1E5 strain, produces MEL-B having an acetyl group bound to position 6 of mannose; thus, the structurally unknown MEL is thought to be MEL-B. The signal of mannose position 2 was shifted in the low-field (5.38-5.39 ppm), and the P. tsukubaensis 1E5 strain produces MEL-B having fatty acid chains at position 2 and 3 of mannose; thus, a fatty acid chain is thought to be bound to position 2 of mannose. These results revealed that the structurally unknown MEL produced by the PtMMF1-disrupted strain is monoacylated MEL-B, which has a single fatty acid chain bound to position 2 of mannose.

5. Measurement of Surface Tension of MEL Mixture Produced by PtMMF1-Disrupted Strain An evaluation in regards to interfacial activity was performed on a MEL mixture containing monoacylated MEL-B as a main component, and monoacylated MEL-D, diacylated MEL-B, and diacylated MEL-D as sub-components, which was obtained by extracting a yeast cell culture broth of the PtMMF1-disrupted strain with acetone. An acetone extract was subjected to open column using a silica gel column (Wakosil C-200, produced by Fujifilm Wako Pure Chemical Corporation), and the remaining fat and oil and remaining fatty acid in the extract were removed. The surface tension was measured with a DropMaster DMo-501 (produced by Kyowa Interface Science Co., Ltd.), and the surface tension of the MEL mixture of various concentrations was measured.

Figure 8:
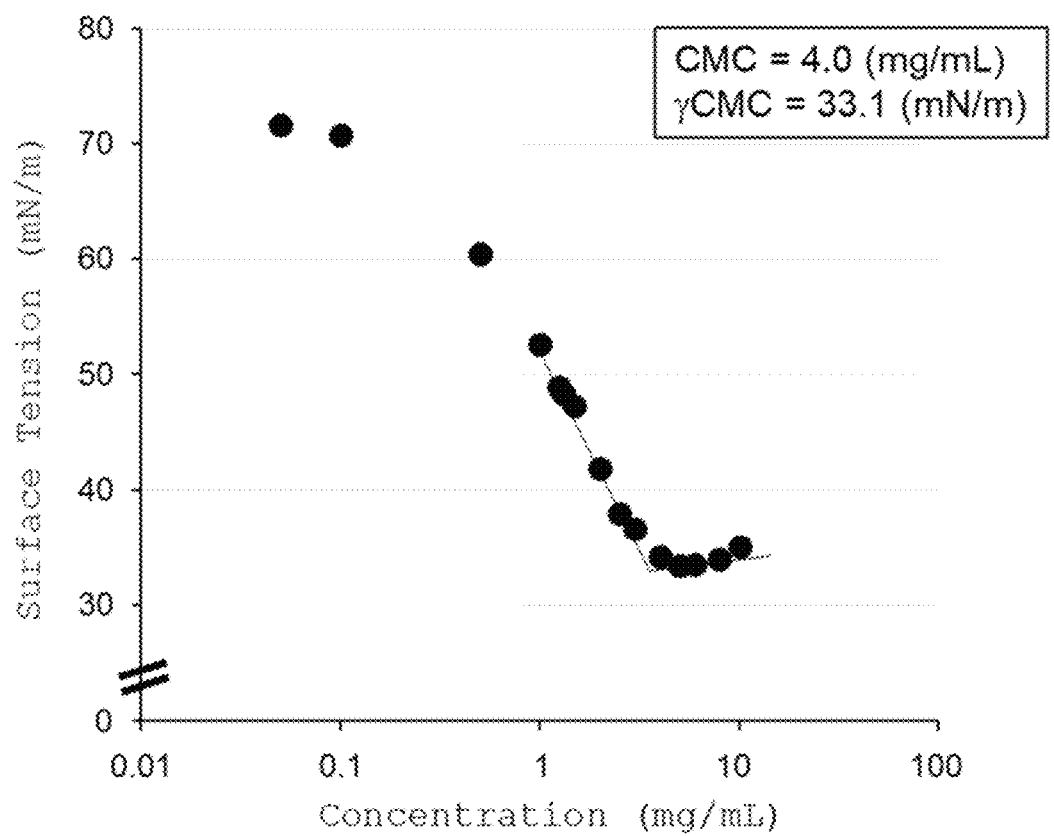
FIG. 8 shows the results of measuring the surface tension of an acetone extract from a PtMMF1-disrupted strain culture broth.

As shown in FIG. 8, the value of surface tension decreased with the increase of the concentration of the MEL mixtures and became constant when having reached the critical micelle concentration (CMC). FIG. 8 indicates that the CMC of the MEL mixture was 4.0 mg/mL. From the molecular weight, 452, of the monoacylated MEL-B (caprylic acid adduct), which is the main component of the MEL mixture, the CMC is converted to $8.88 \times 10^{-3}$ M. The γCMC was 33.1 mN/m.

Diacylated MEL-B produced by the parent strain is known to have a CMC of $3.1 \times 10^{-6}$ M (T. Fukuoka et al., Carbohydrate Research., 351 (2012) 81-86). The MEL mixture produced by the PtMMF1-disrupted strain has a CMC at least 1000 times higher than diacylated MEL-B, and can be homogeneously dispersed in water as a single MEL molecule even at a high concentration, showing improved water-solubility and a capability of being readily dissolved in water. Specifically, the MEL mixture produced by the PtMMF1-disrupted strain is easy to use in aqueous systems.

From the results shown in FIG. 6, the MELs produced by the PtMMF1-disrupted strain are estimated as the following: about 33 mass % of diacylated MEL-B, about 50 mass % of monoacylated MEL-B, and about 17 mass % of monoacylated MEL-D.

Sequence List P20-28 OWO PCT monoacylated MEL 20201202_131233_0.txt

The invention claimed is:

1. A microorganism of the genus *Pseudozyma* producing monoacylated MEL-B, wherein the microorganism is deficient in a gene encoding a transporter MMF1.

2. The microorganism according to claim 1, further producing monoacylated MEL-D.

3. The microorganism according to claim 1, wherein the microorganism is *Pseudozyma tsukubaensis*.

4. A method for producing monoacylated MEL-B by culturing the microorganism of claim 1.

5. A MEL-containing composition obtained by culturing the microorganism of claim 1, wherein the composition further comprises monoacylated MEL-B and an aqueous solvent.

6. The microorganism according to claim 3, further producing monoacylated MEL-D.

7. A method for producing monoacylated MEL-B by culturing the microorganism of claim 6.

8. A MEL-containing composition obtained by culturing the microorganism of claim 6, wherein the composition further comprises monoacylated MEL-B.

9. A method for producing monoacylated MEL-B by culturing the microorganism of claim 2.

10. A method for producing monoacylated MEL-B by culturing the microorganism of claim 3.

11. A MEL-containing composition obtained by culturing the microorganism of claim 2, wherein the composition further comprises monoacylated MEL-B and an aqueous solvent.

12. A MEL-containing composition obtained by culturing the microorganism of claim 3, wherein the composition further comprises monoacylated MEL-B and an aqueous solvent.

* * * * *